Dec. 5, 1933.   M. T. DENNE ET AL   1,937,815
EVENING AND GRADING MACHINE
Filed June 16, 1930   6 Sheets-Sheet 1
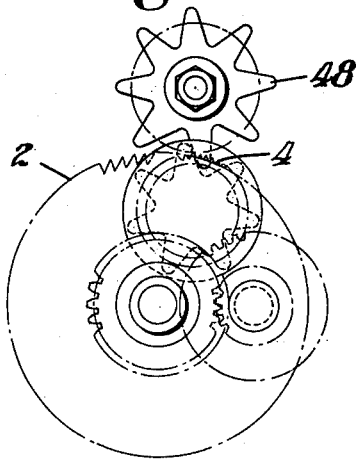
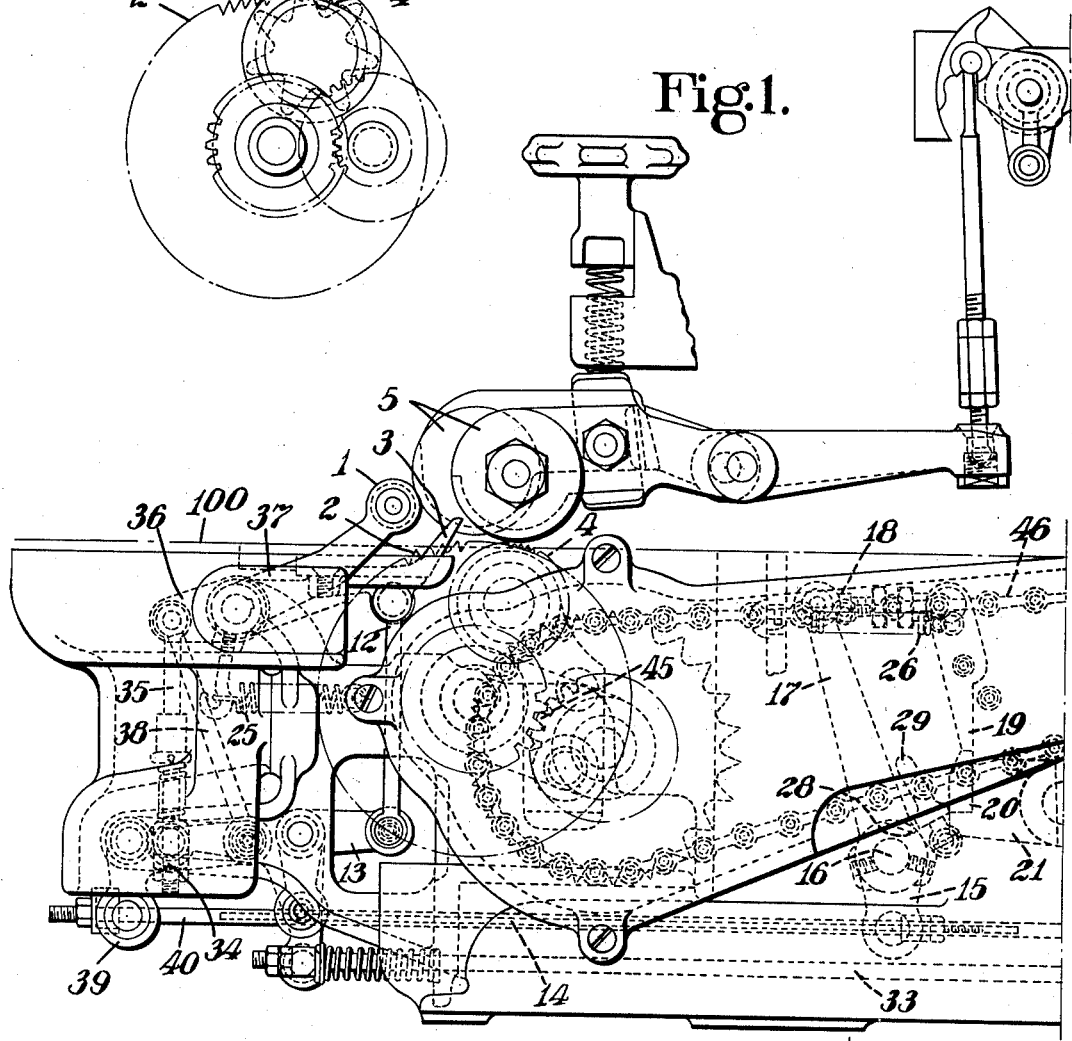

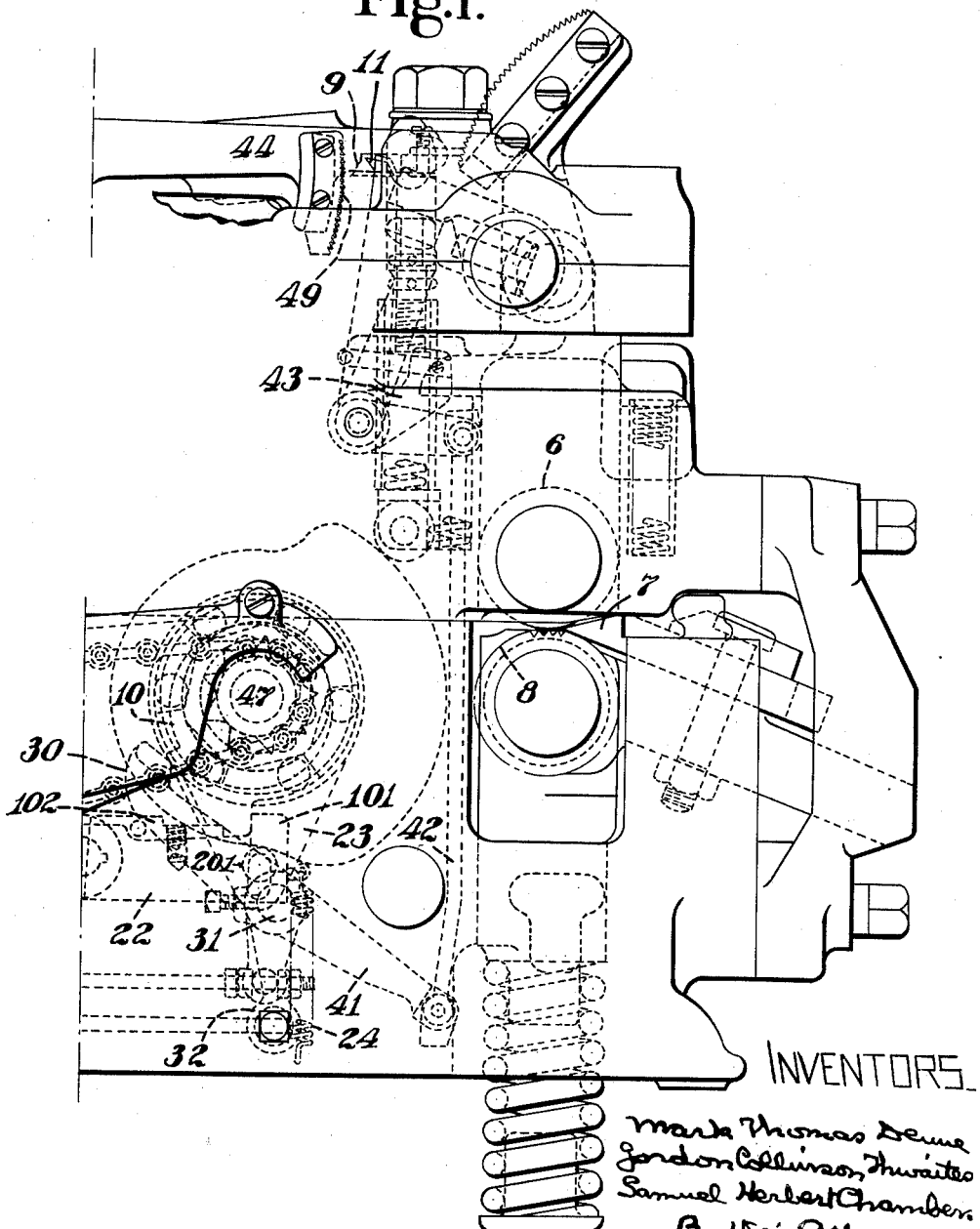

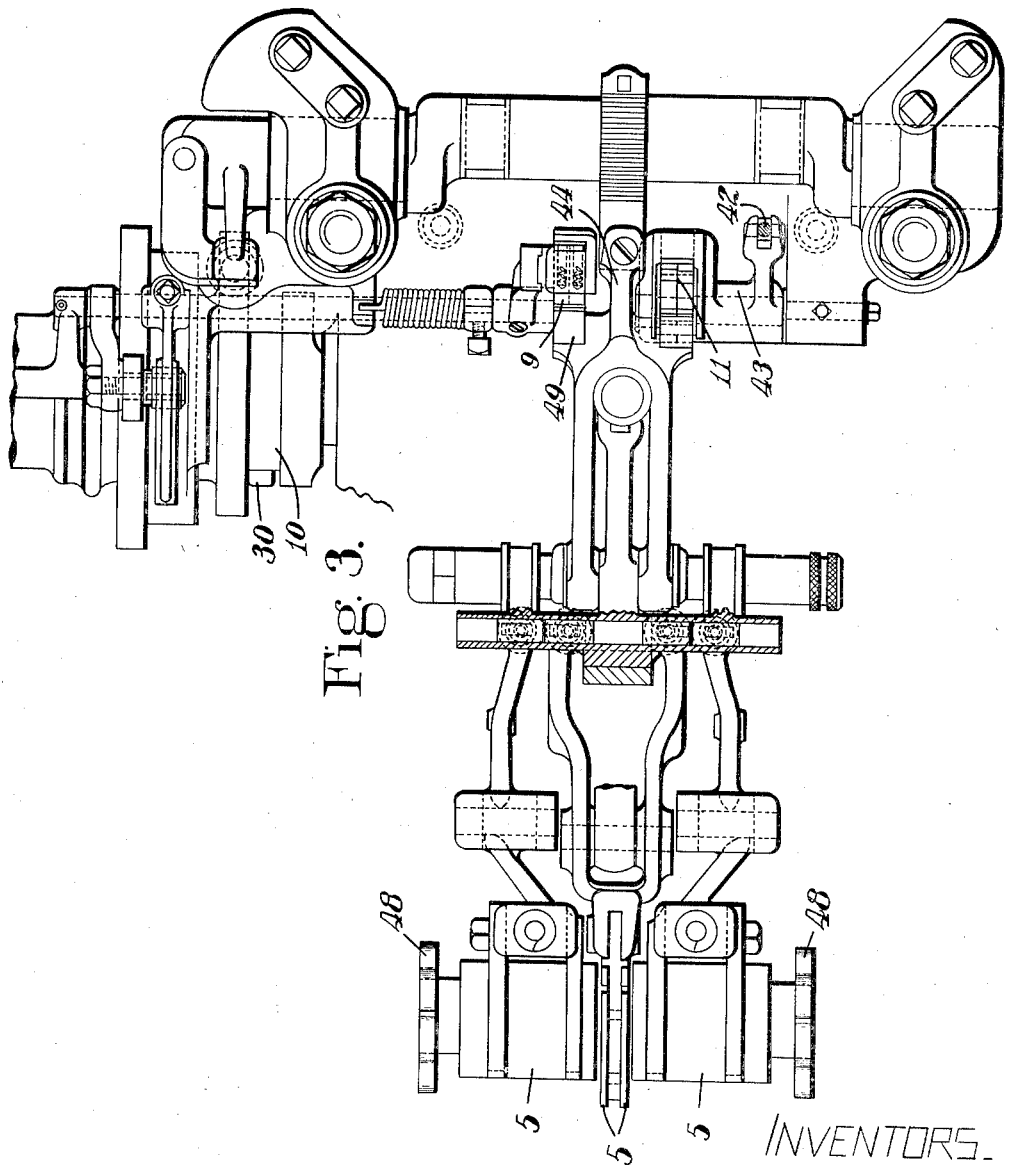

Dec. 5, 1933.                M. T. DENNE ET AL                1,937,815
                         EVENING AND GRADING MACHINE
                           Filed June 16, 1930        6 Sheets-Sheet 4

INVENTORS_
Mark Thomas Denne
Gordon Collinson Thwaite
Samuel Herbert Chamber
By their Attorney,
Harlow M. Davis

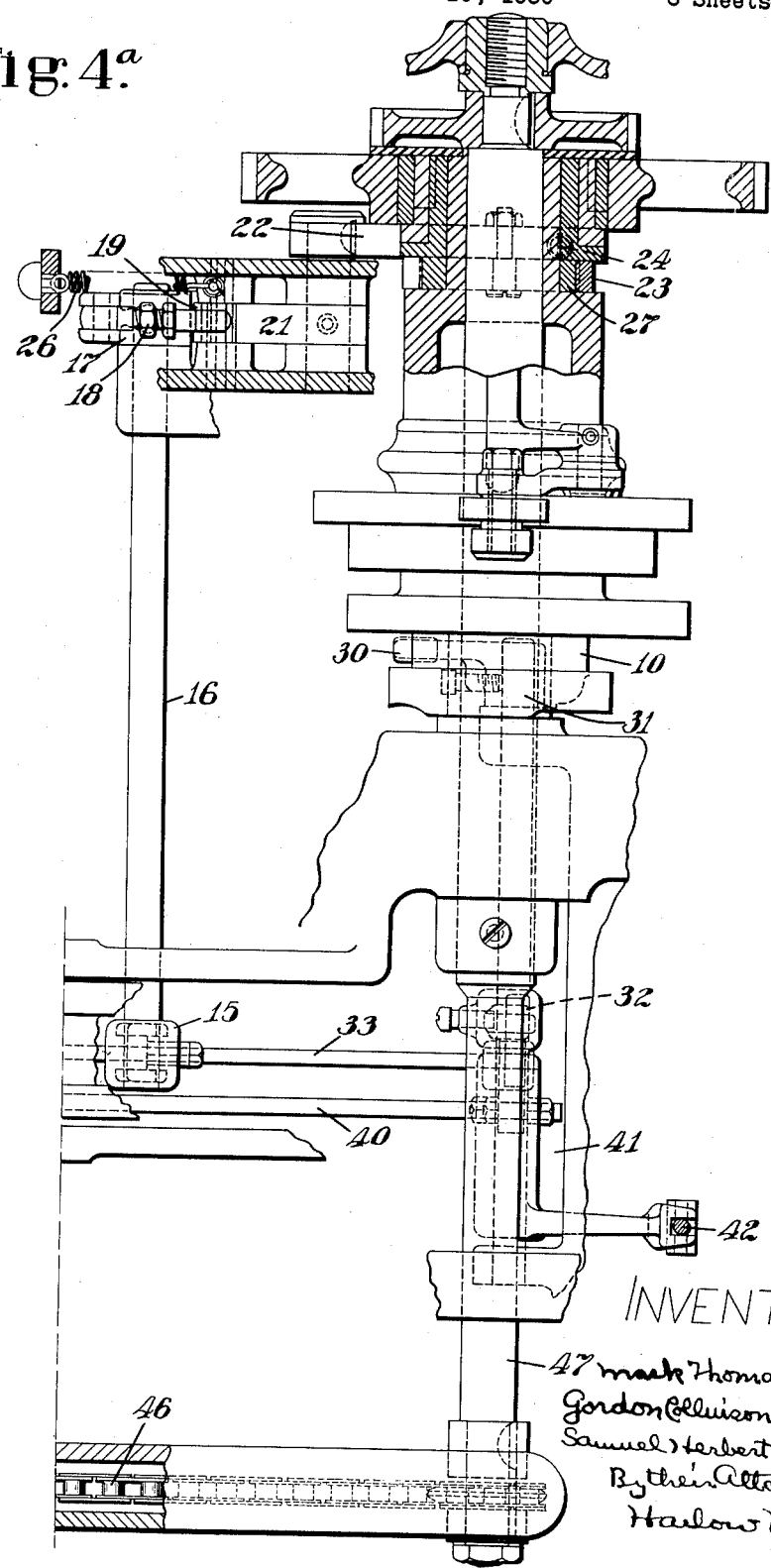

Dec. 5, 1933.  M. T. DENNE ET AL  1,937,815
EVENING AND GRADING MACHINE
Filed June 16, 1930   6 Sheets-Sheet 6

INVENTORS
Mark Thomas Denne
Gordon Collinson Thwaites
Samuel Herbert Chambers
By their Attorney,
Harlow M. Davis Patented Dec. 5, 1933

1,937,815

UNITED STATES PATENT OFFICE 1,937,815

EVENING AND GRADING MACHINE

Mark Thomas Denne, Gordon Collinson Thwaites, and Samuel Herbert Chambers, Leicester, England, assignors to United Shoe Machinery Corporation, Paterson, N. J., a corporation of New Jersey Application June 16, 1930, Serial No. 461,454, and in Great Britain June 17, 1929

5 Claims. (Cl. 69—11)

This invention relates to grading machines and is herein illustrated as embodied in a grading machine of the general type which commonly either marks or splits or performs both operations upon pieces of work, such as soles, in accordance with the thickness of the thinnest spot in a selected locality of work detected by a feeler mechanism.

According to one feature of the invention, a construction is provided whereby in a machine of this type presentation of a piece of work to the feeler mechanism starts the operation of the machine which continues until the piece of work has been graded. In the illustrated machine presentation of the work to the feeler mechanism depresses a plurality of trip fingers to throw in a one-revolution clutch, said clutch during its one revolution being effective to carry the work through the machine and to reset the feeler mechanism including the trip fingers with its parts in position to receive another piece of work.

Commonly the feeler mechanisms of machines of the general type referred to detect the thinnest spot along opposite edges of a sole or other piece of work so that the sole is graded in accordance with the thinnest spot in its edge. It is desirable, however, in some instances to detect the thinnest spot in a series of localities extending across the sole from edge to edge; and, in accordance with another feature of the invention, a feeler mechanism which operates in this manner is provided. In the illustrated machine, a series of feelers arranged side by side extends across the sole, as it passes beneath them, and set the grading mechanism in accordance with the thinnest spot encountered by any one of the feelers whether that spot is located at one of the opposite edges of the sole or in the middle portion of the sole.

These and other features of the invention will be described as embodied in a machine for grading soles which is similar to that shown in United States Letters Patent No. 1,651,588, granted December 6, 1927 upon an application filed in the name of Mark T. Denne to which reference is made for details of construction not herein set forth.

Referring now to the accompanying drawings,

Figs. 1 and 1ª show a side elevation of a machine in which the present invention is embodied, Fig. 1ª being a continuation of the right-hand portion of Fig. 1;

Fig. 2 is a detail in elevation of part of the mechanism for rotating the feeler rolls;

Fig. 3 is a plan view of a portion of the machine;

Figure 4:
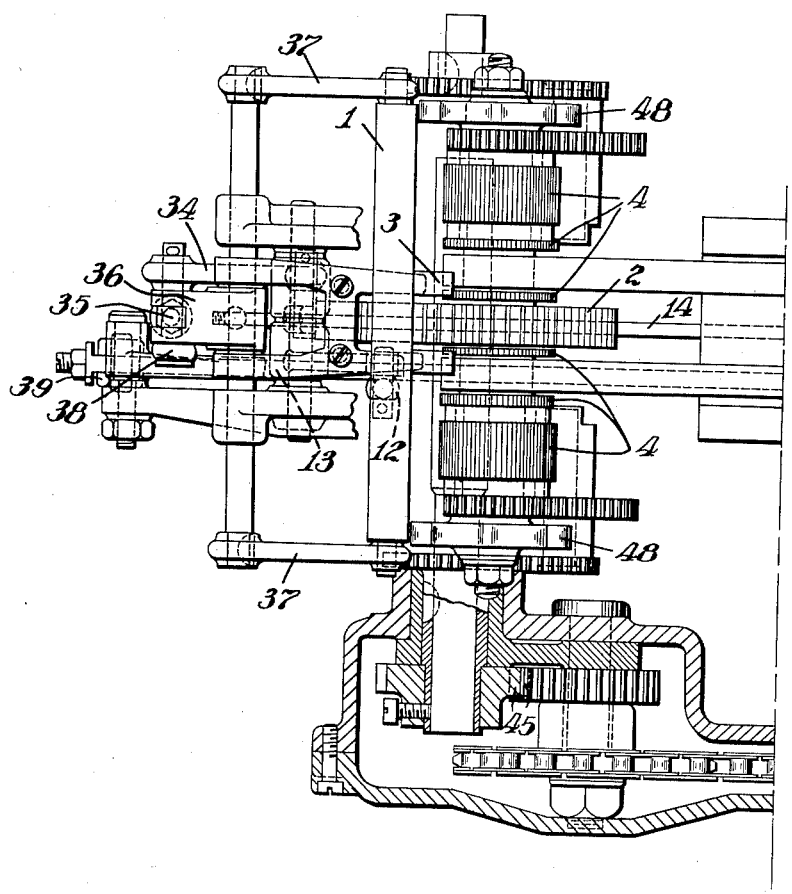
Figure 7:
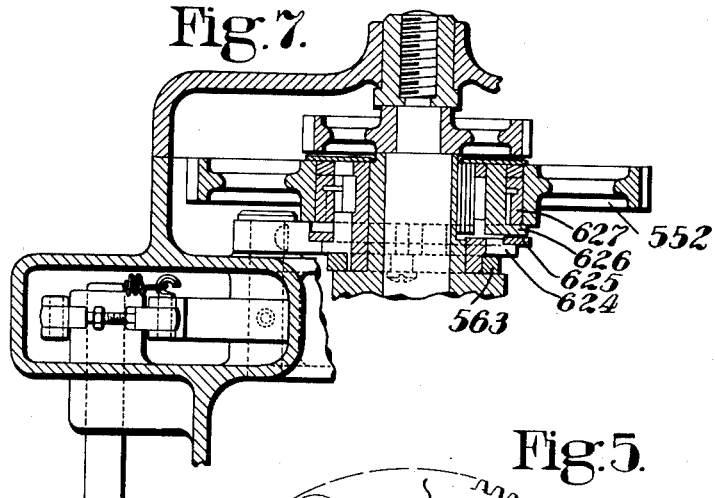
Figure 5:
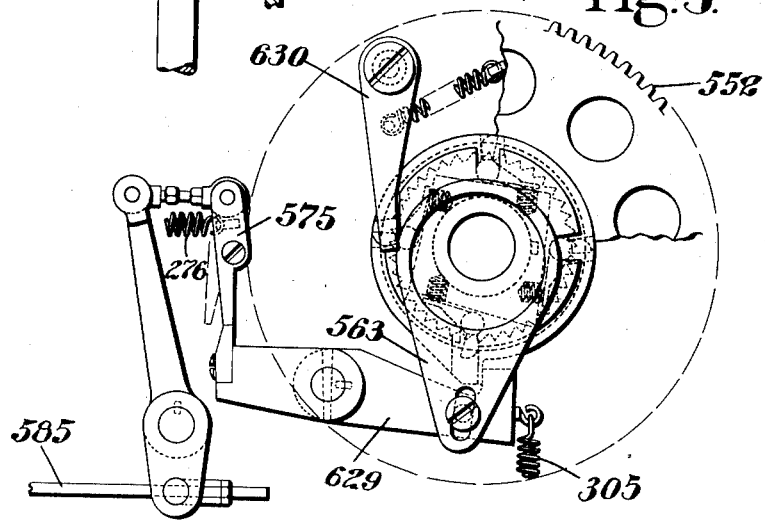
Figure 6:
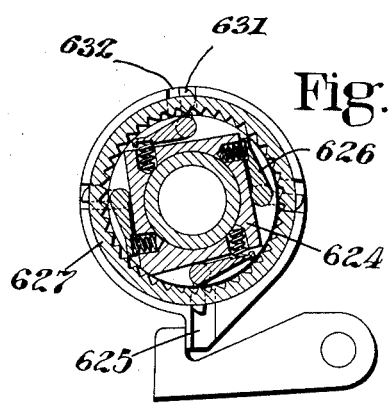

Figs. 4 and 4ª show a plan view of the machine, partly in section, Fig. 4ª being a continuation of the right-hand portion of Fig. 4;

Fig. 5 is a side elevation of a modified form of a one-revolution clutch;

Fig. 6 is a vertical section through a portion of this clutch viewed from the side opposite to that shown in Fig. 5; and Fig. 7 is a horizontal sectional view of this clutch.

A suitable horizontal work support or table 100 is provided upon which the operator places the workpiece which he then pushes beneath a horizontal roller or gate 1 against a pair of upstanding trip fingers 3 carried on the end of a rocking arm. The pressure of the sole against the fingers depresses these and the rocking arm about a horizontal axis, thereby also depressing a rod 12 one end of which is connected to said arm and the other end of which is connected by a bell crank lever 13, a long horizontal rod 14 running longitudinally of the machine, a short lever 15, a rock-shaft 16, a longer upstanding lever 17 on said shaft, and an adjustable link 18, respectively, to a pawl 19 which is thereupon disengaged from a second pawl 20. This second pawl is mounted on the forward end of a rocking lever 21, rocking of which in a clockwise direction serves to disengage the roll cage of a Horton clutch, from the constantly rotating driving shaft 47, the clutch being shown in its disengaged position, being held in this position by an abutment 101 on the inner end of the rocking lever 21 which engages the usual nose formed on the cage of the Horton clutch. The usual spring-pressed catch 102 is provided for engaging the opposite side of the nose so as to prevent the roll cage from rebounding. A tension spring 24, attached at its upper end to the inner end of the rocking lever 21, tends at all times to pull that end of the lever down; but such downward movement is prevented, when the parts are in the position shown, by the engagement of the pawl 20 with the pawl 19. If now the pawl 19 is rocked, as has been described by presenting a piece of work to the machine so that it becomes disengaged from the pawl 20, the spring 24 will pull down the inner end of the rocking lever 21 thereby disengaging the abutment 101 from the nose on the roll cage and permitting the shaft 47 to drive the cam hub and sprocket which operate the machine, In order to cause the clutch cage to make one revolution and then come to rest, the inner end of the rocking lever 21 carries a horizontal stud 201 which extends through a vertical slot in a depending flange on an eccentric strap 23 which rises during the first half of the revolution of the roll cage and, during the last half returns to the position shown. When now the pawl 19 is swung out of engagement with the pawl 20, the spring 24 pulls down the inner end of the lever 21, thereby disengaging the abutment 101 from the nose on the roll cage of the clutch and permitting the clutch to connect the driving shaft 47 to the cam hub whereby the machine starts running. At this time the horizontal stud 201 is at the bottom of the vertical slot in the eccentric strap 23. As the roll cage makes a half revolution, the eccentric strap pulls up the stud, and with it the inner end of the rocking lever 21, to bring the abutment 101 into position to engage the nose on the roll cage at the completion of one revolution. Meantime the pawl 19 has returned to the position shown, and the pawl 20 snaps back into engagement with it, so that the abutment 101 is held up in the position shown and stops the operation of the machine.

If desired the rock shaft 16 referred to may be provided with a notched collar 28, the arrangement being such that when it is desired to run the machine continuously the shaft may be turned round until the notch is engaged by a suitable catch 29 so that the pawls are maintained out of engagement with each other and the cams are driven continually.

The cam hub having been started up, a cam on the same then releases the gate which is pulled yieldingly down upon the sole against the work table.

The sole as it passes the fingers 3 referred to is engaged on its under surface by a central large serrated feed wheel 2, and a plurality of other and preferably smaller serrated feed wheels 4, say three on each side of the center line of the machine, located slightly to the rear of the central feed wheel. The feed wheels are geared together and driven by suitable chain, sprockets, and gear wheels as shown in Figures 1 and 2.

The feed wheels are also connected by gear or star wheels 48 with the two outer of four gauge rolls or feelers 5 so as to drive them positively. The feelers are above the sole and are mounted on the forward ends of three independently rocking levers (the centre lever carrying the two centre feelers) which are yieldingly pressed so that the feelers engage against the upper surface of the sole. The feelers act on separated localities for the full width of the sole and move up and down independently according to variations in the thickness of the sole. Connected up with said feelers we provide ball ended rods (one of which is shown at 46 in Fig. 1 of the patent referred to above) whereby movement is imparted to a floating lever 44 that carries a pawl plate 49, means including a pawl 9 being provided to permit said floating lever to move in one direction only (i. e. to move only when a feeler is engaging a thinner part of a series of localities for the full width of the sole) so that the pawl plate occupies a position dependent on the thickness of the thinnest portion of the sole. Other means including another pawl plate on the lever 44 and a pawl 11 are also provided for locking said floating lever when the rear end of sole moves beyond the feelers, said means being operated by the downward movement of the gate on to the table, for which purpose the gate and said means are suitably connected. As soon as the fingers referred to are tripped by the sole the gate closes on to the sole and is held thereagainst by spring pressure. As long as there is any substance keeping the gate from closing on to the table the pawl 11 is held out, but as soon as the gate drops to the table the pawl 11 engages, setting the floating lever and pawl plate 49 with the latter in the lowest position reached under the influence of any one of the feelers while the feeler was passing over the surface of the sole.

The upper of a pair of rollers 6, 8 that feed the sole to a skiving knife 7 is adjusted vertically relatively to the knife according to the position of said pawl plate so that the sole is skived to a uniform thickness equal to the thinnest part of the unskived sole.

After the sole has passed the fingers they are raised by a suitable spring 25 and the pawl 19 connected thereto is returned towards its normal position (unless the catch 29 referred to prevents this). As the main or cam shaft completes one half of a revolution the eccentric strap 23 moves the rocking lever 21 as has been described until the co-operating pawls can again engage, the pawl 19 snapping into position under influence of a spring 26. During the next half revolution the slot in the eccentric permits the latter to move without actuating said rocking lever, the stud on which is normally at the top of said slot.

The sole is fed past the feelers on to an endless conveyor belt which feeds the sole to a usual stamping device whereupon the conveyor is momentarily stopped by means of a cam operating on a dog clutch whilst the leather is stamped, the stamping device having previously been automatically adjusted according to the position taken up by the floating lever and pawl plate referred to.

The conveyor then moves the sole to the rollers 6, 8, which feed it to the skiving knife.

When the sole has been skived, the means which prevent movement of the floating lever in one direction are thrown out of action; the gate is then raised by a cam 10 (through a bell crank and rod); and, since the floating lever locking means (the pawl 11) is connected to the gate, the same is simultaneously thrown out of action so that the feelers move to their normal positions (for example one-sixteenth of an inch from the feed wheels); immediately thereafter; and, as the roll clutch cage completes a full revolution, it is tripped by the abutment 101 and the cam hub and cams stopped.

When the floating lever locking means are thrown out the upper of the pair of splitting rollers falls so that the distance between the roller and knife is equal to the thinnest work to be skived (for example one-sixteenth of an inch).

The operation of the machine is thus stopped with the gate raised ready for the insertion of the next sole or other piece of work and with the feelers and upper splitting roller in lowered positions.

The chain drive 46 for the feed wheels which it drives through gears 45 may be driven by gearing from the rollers 6, 8, that feed the sole to the knife, and these rollers are preferably driven as is the conveyor through its dog clutch, from the constantly running main shaft 47 of the machine.

Figures 1 to 4 of the drawings show the relative position of the machine parts just before the piece of leather is fed into the machine.

The gate 1 is in a raised position ready to receive the work. As soon as the work is pushed under the gate it is fed into the machine by the continually driven feed wheel 2 depressing the fingers 3 which causes the clutch of the cam hub to engage.

The raising of the gate 1 by the cam 10 is performed through an actuating lever 30 which is connected through a shaft 31, lever 32, rod 33, bell-crank lever 34, rod 35 and levers 36 and 37 to the gate.

The pawl 11 is connected to the gate lever 36 by a link 38, bell-crank lever 39, rod 40, bell-crank lever 41, rod 42 and lever 43.

Immediately after the sole or other piece of work has entered the machine and the first part of it has raised the measuring rolls 5, thus raising the grading arm 44 a distance proportional to the thickness at that point, the pawl 9 is allowed to engage with the ratchet plate 49 by a cam on the cam hub. Just at the end of the cycle of the machine, before the gate rises, the pawl 9 is thrown out by the same cam.

Instead of a roll clutch for the cam hub a pawl clutch may be used and such a one is illustrated in Figures 5 to 7, which show the clutch in the free position. Four pawls, 626, are so arranged in the clutch pawl block 624 as to give ¼ tooth pick up. This arrangement is used to ensure that the stamp shall act in approximately the same position on the work in all cases for were a single pawl only used with such a gear rack 627 as shown the passing of the pawl into one tooth rather than its neighbour in the closing of the clutch under the action of the sole on the fingers 3 would alter the stamp position on the work 1¼".

Each of the four pawls 626 forms one arm of four bell crank levers whose other arms are formed by latches 631. These latches 631 project into four apertures 632 in the pawl cage 625. When the clutch is in the disengaged position (as shown, for example, in Figure 6), i. e. when the nose piece on the pawl cage 625 contacts with an abutment on the stop lever 629, each pawl 626 is held out of engagement with the driving gear rack against the pressure of its pawl spring on account of the pressure of an inclined face on the corresponding latch 631 against the edge of the aperture 632 in the pawl cage 625 into which the latch projects. When the clutch is engaged (by dropping of the stop lever 629) the latches are no longer pressed against the sides of their apertures and the pawls are pressed upward by their springs until one of them engages with a tooth of the constantly revolving gear rack 627. The pawl block 624 and the pawl cage 625 are then carried round through one revolution until the nose piece on the pawl cage strikes the abutment on the stop lever 629 (which during the revolution has risen up again). This locks the pawl cage 625. The pawl block 624 continues to move only until the inclined faces of the latches 631 have moved up against the sides of their apertures in the pawl cage 625. This presses the pawls 626 down against the pressure of their pawl springs and so releases the pawls from the revolving gear rack 627.

The clutch is engaged by movement of the rod 585 (corresponding to the rod 14). This disengages the pawl 575 corresponding to the pawl 19, allowing the stop lever 629 to be pulled to the bottom of the slot in the eccentric strap 563 by the spring 305. This releases the pawl cage 625 and allows one of the four pawls to engage in a tooth of the driving gear rack 627. The latter is constantly running. The clutch pawl block is keyed to the cam hub.

The cam hub then rotates to complete one cycle. By the time the hub has moved one half-turn (180°), the eccentric on the clutch pawl block has lifted the stop lever 629 allowing the pawl 575 to be pulled by the spring 276 to position thus holding the stop lever up until the next piece of work trips the pawl.

The cam hub continues its rotation until the nose piece on the pawl cage 625 strikes the stop lever 629, simultaneously disengaging all four pawls from the gear wheel rack. As soon as these pawls are clear of the rack a back stop lever 630 engages a tooth of the clutch pawl block 624 thus preventing any back creep of the cam hub which, if it took place, would allow one of the pawls 626 to engage again or attempt to do so.

What we claim is:—

1. A machine of the class described having, in combination, grading mechanism, feeler mechanism for detecting the thinnest spot in a selected locality of the work and for setting the grading mechanism in accordance with this thickness, a trip member located in the path of presentation of the work adapted to be moved by the work as it is presented to the machine for starting the operation of the machine to cause the work to be graded, and means for bringing the machine to rest thereafter with the parts in position to permit the presentation of a second piece of work.

2. A machine of the class described having, in combination, grading mechanism, feeler mechanism for detecting the thinnest spot in a selected locality of the work and for setting the grading mechanism in accordance with this thickness, a normally inoperative clutch for starting and stopping the machine and for controlling its operation, a trip member normally located in the path of presentation of a piece of work adapted to be moved by the work as it is presented to the machine for rendering the clutch operative, and means for disengaging the clutch thereafter to bring the machine to rest with the trip member in position to be engaged and moved by presentation of a second piece of work.

3. A machine of the class described having, in combination, grading mechanism, feeler mechanism for detecting the thinnest spot in a selected locality of the work and for setting the grading mechanism in accordance with this thickness, a normally inoperative clutch for starting and stopping the machine and for controlling its operation, a gate in front of the feeler mechanism, said gate being normally in raised position to permit presentation of a piece of work, a trip member normally located to engage and be moved by the work as it is presented beneath the gate, means operated by the movement of the trip member for rendering the clutch operative to start the machine and to permit the gate to fall upon the work, and means for thereafter rendering the clutch inoperative and bringing the machine to rest with the gate and the trip members returned to their normal positions to permit the presentation of a second piece of work.

4. A machine of the class described having, in combination, grading mechanism, feeler mechanism including a series of independently movable feelers arranged to extend widthwise across the full width of the work for detecting the thinnest spot in the work at the localities engaged by the feelers and for setting the grading mechanism in accordance with this thickness, a trip member normally located in the path of presentation of the work adapted to be moved by the work as it is presented to the machine for starting the operation of the machine to cause the work to be graded, and means for bringing the machine to rest thereafter with the trip member in position to permit the presentation of another piece of work.

5. A machine of the class described having, in combination, grading mechanism, feeler mechanism including a plurality of independently movable feelers arranged to extend widthwise across the full width of the work, means for feeding the work past the feelers while they are in engagement with the work so as to cause the work to be traversed lengthwise by the feelers, and means acting to adjust the grading mechanism progressively in accordance with thinner spots encountered by the feelers in the moving work and to adjust the grading mechanism finally in accordance with the thinnest spot encountered.

MARK THOMAS DENNE.
GORDON COLLINSON THWAITES.
SAMUEL HERBERT CHAMBERS.